United States Patent
Biles et al.

(10) Patent No.: US 8,055,872 B2
(45) Date of Patent: Nov. 8, 2011

(54) DATA PROCESSOR WITH HARDWARE ACCELERATOR, ACCELERATOR INTERFACE AND SHARED MEMORY MANAGEMENT UNIT

(75) Inventors: Stuart David Biles, Little Thurlow (GB); Nigel Charles Paver, Austin, TX (US); Chander Sudanthi, Austin, TX (US)

(73) Assignee: ARM Limited, Cambridge (GB)

( * ) Notice: Subject to any disclaimer, the term of this patent is extended or adjusted under 35 U.S.C. 154(b) by 815 days.

(21) Appl. No.: 12/071,505

(22) Filed: Feb. 21, 2008

(65) Prior Publication Data

US 2009/0216958 A1    Aug. 27, 2009

(51) Int. Cl.
*G06F 13/40* (2006.01)
(52) U.S. Cl. .. 711/169; 711/154; 711/148; 711/E12.066
(58) Field of Classification Search ................. 711/148, 711/154, 169, E12.066
See application file for complete search history.

(56) References Cited

U.S. PATENT DOCUMENTS

| | | | |
|---|---|---|---|
| 6,895,508 B1 * | 5/2005 | Swanberg et al. | 726/16 |
| 2003/0028751 A1 * | 2/2003 | McDonald et al. | 712/34 |
| 2004/0003204 A1 * | 1/2004 | Yamada et al. | 712/209 |

OTHER PUBLICATIONS

Sirowy et al.: "Two-Level Microprocessor-Accelerator Partitioning," EDAA, Department of Computer Science and Engineering—University of California, Riverside, pp. 313-318, 2007.
Lazanyi: "Instruction Set Extension Using Microblaze Processor," IEEE 2005, Budapest University of Technology and Economics Department of Measurement and Information Systems, Budapest, pp. 729-730.
Takeuchi et al.: "Scalable Bus Interface for HSDPA Co-processor Extension," IEEE 2005 Custom Integrated Circuits Conference, pp. 51-54.
Hodjat et al.: "Interfacing a High Speed Crypto Accelerator to an Embedded CPU," IEEE, pp. 488-492, 2004.

* cited by examiner

*Primary Examiner* — Mardochee Chery
(74) *Attorney, Agent, or Firm* — Nixon & Vanderhye P.C.

(57) ABSTRACT

A data processing system in the form of an integrated circuit includes a general purpose programmable processor and a hardware accelerator. A shared memory management unit provides memory management operations on behalf of both of the processor core and the hardware accelerator. The processor and the hardware accelerator share a memory system. A first communication channel between the processor and the hardware accelerator communicates at least control signals therebetween. A second communication channel coupling the hardware accelerator and the memory system allows the hardware accelerator to perform its own data access operations upon the memory system.

29 Claims, 4 Drawing Sheets

DATA PROCESSOR WITH HARDWARE ACCELERATOR, ACCELERATOR INTERFACE AND SHARED MEMORY MANAGEMENT UNIT

BACKGROUND OF THE INVENTION

1. Field of the Invention

This invention relates to the field of data processing systems. More particularly, this invention relates to data processing systems including hardware accelerators and the interface used to couple such hardware accelerators to the remainder of the data processing system.

2. Description of the Prior Art

It is known to provide hardware accelerators of various different forms in order to increase the performance and efficiency of data processing systems. One type of hardware accelerator are large bus-based accelerators, such as video accelerators. These accelerators are usually accessed through device driver software and carry a high overhead for initiating tasks to be accelerated. Accordingly the tasks to be accelerated have to be large in order to effectively amortise this setup cost. Furthermore, the use of the device driver requires the involvement of the operating system and modification thereof, which is a disadvantage.

Another type of known hardware accelerator are coprocessors, such as the coprocessors known in conjunction with ARM general purpose processors. With such coprocessors, the general purpose processor is responsible for supplying both instructions and data to the coprocessor. This disadvantageously consumes resource of the general purpose processor thereby reducing the gain achieved. Furthermore, in order to lower the overhead associated with invoking the coprocessor activity, the coprocessor interface to the general purpose processor is closely adapted to the underlying micro-architecture of the general purpose processor. This makes it difficult to reuse coprocessor designs across multiple different general purpose processors.

It is also known to provide core extensions to the configurable processors produced by companies such as ARC and Tensilica. These configurable processors provide a mechanism for mapping hardware assistance into the instruction set of the main core. This provides access to the registers of the core by the hardware assist circuitry and may also add new registers to the core if appropriate. However, this approach requires changes to the assembler and compiler software for the core in order to support new added instructions. Such modification of the software tool chain is time consuming and expensive. Furthermore, load and store traffic to the hardware assist circuitry is normally handled by the core load-store instructions consuming resource of the general purpose processor. Some examples using FIFO interfaces to the hardware assist circuitry are known but these use a DMA unit to load them and do not integrate with the memory management functions of the system as a whole.

SUMMARY OF THE INVENTION

Viewed from one aspect the present invention provides apparatus for processing data comprising:

a programmable general purpose processor operating under program instruction control to perform data processing operations;

a memory system coupled to said processor, said memory system operating to store data values to be processed by said processor;

a hardware accelerator coupled to said processor and to said memory system and operating to perform data processing operations upon data values accessed in said memory system;

a shared memory management unit coupled to said processor, said memory system and said hardware accelerator and operating to perform memory management operations in respect of memory accesses to said memory system by said processor and by said hardware accelerator;

a first communication channel between said processor and said hardware accelerator for transferring at least control signals between said processor and said hardware accelerator; and a second communication channel coupling said hardware accelerator and said memory system for transferring data access operations between said hardware accelerator and said memory system.

The present invention provides at least one hardware accelerator in conjunction with at least one programmable general purpose processor with an interface that allows efficient, low-overhead use of the hardware accelerator and reuse of the memory management mechanisms provided for the general purpose processor. More particularly, a shared memory management unit is coupled to both the general purpose processor and the hardware accelerator and performs memory management operations in respect of memory accesses to the memory system by both the general purpose processor and the hardware accelerator. The shared memory system allows the processor and the hardware accelerator to also share any cached data and the infrastructure provided to support such cached data. The first communication channel permits the processor to exchange at least control signals with the hardware accelerator and the second communication channel (which may be direct or indirect) allows the hardware accelerator to perform data access operations with the memory system.

In some embodiments the operation and control of the hardware accelerator is simplified when the processor and the hardware accelerator share a context with which the shared memory management unit is configured. In this way, the operating system need only be aware of the processor context and in a large number of cases this will not represent a significant constraint as the hardware accelerator will operate in the same context as the processor.

In other embodiments the shared memory management unit can be configured with separately provided contexts for the processor and hardware accelerator. This can permit the hardware accelerator to operate more independently of the processor and extend the situations in which it can be used.

When using separate contexts for the processor and the hardware accelerator, these can be supported by the use of separate translation table base registers within the shared memory management unit.

The programming of the hardware accelerator translation table base register can be simplified by arranging that the content of the processor translation page table base register be copied to the hardware accelerator page table base register when a processing task is started upon the hardware accelerator. This context can then persist with the hardware accelerator until the next task is started thereupon. The copying can be automatically provided by the hardware or performed by the operating system on starting an accelerator unit.

The shared memory management unit may be a memory protection unit storing a plurality of memory region descriptor (possibly separately for the processor and the hardware accelerator) giving memory attributes applied to said regions.

It will be appreciated that the first communication channel between the processor and the hardware accelerator can transfer a variety of control and data signals. In particular, the first communication channel can transfer one or more of task request data specifying a task to be performed by the hardware accelerator (e.g. a pointer to a task structure); one or more input/output data values for the hardware accelerator; a pointer to one or more input/output data values for the hardware accelerator; and a pointer to one or more storage locations to be used for temporary value storage by the hardware accelerator. It will be appreciated by those in this technical field that alternative and/or additional control signals and data signals may be transferred via the first communication channel as appropriate or desired for a particular hardware accelerator.

The overhead associated with the provision of the hardware accelerator can be further reduced in embodiments in which a load-store unit within the processor is reused by the hardware accelerator to perform data access operations upon the memory system for the hardware accelerator. The second communication channel thus passes via the load-store unit of the processor. These data access operations would be initiated by the hardware accelerator rather than requiring the processor to initiate these transactions, but will utilise the load-store unit circuitry which is already provided within the processor.

A refinement to this reuse of the load-store unit can be obtained in the context of processors including a processor pipeline when the second communication channel injects data access requests from the hardware accelerator into slots (e.g. determined unused by the processor using an arbitration unit) within the processor pipeline so as to use the load-store unit to perform data access operations upon the memory system for the hardware accelerator when the load-store unit is not needed to perform data access operations upon the memory system for the processor.

Synchronisation and/or coordination of the operation of the processor and the hardware accelerator may be facilitated by the provision of barrier instructions executed by the processor. These barrier instructions can take a variety of forms including barrier instructions which stall processing by the processor until the hardware accelerator generates a complete signal passed to the processor to indicate that the hardware accelerator has reached a given processing point. Such a complete signal may be delayed in some embodiments until any pending data accesses for the hardware accelerator have been issued to the memory system (i.e. pending data accesses have been flushed and are visible to the processor). Another form of barrier instruction executed by the processor is one which stalls processing by the processor until the processor has reached a given processing point. An example of such a given processing point would be when any pending data accesses for the processor had been issued to the memory system.

It will be appreciated that the memory management operations performed by the shared memory management unit can take a wide variety of different forms. These memory management operations may, for example, include address translation operations (e.g. support for virtual addressing), memory protection operations (e.g. support for differing privilege levels) and generation of values for fault status/address register upon occurrence of an exception.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
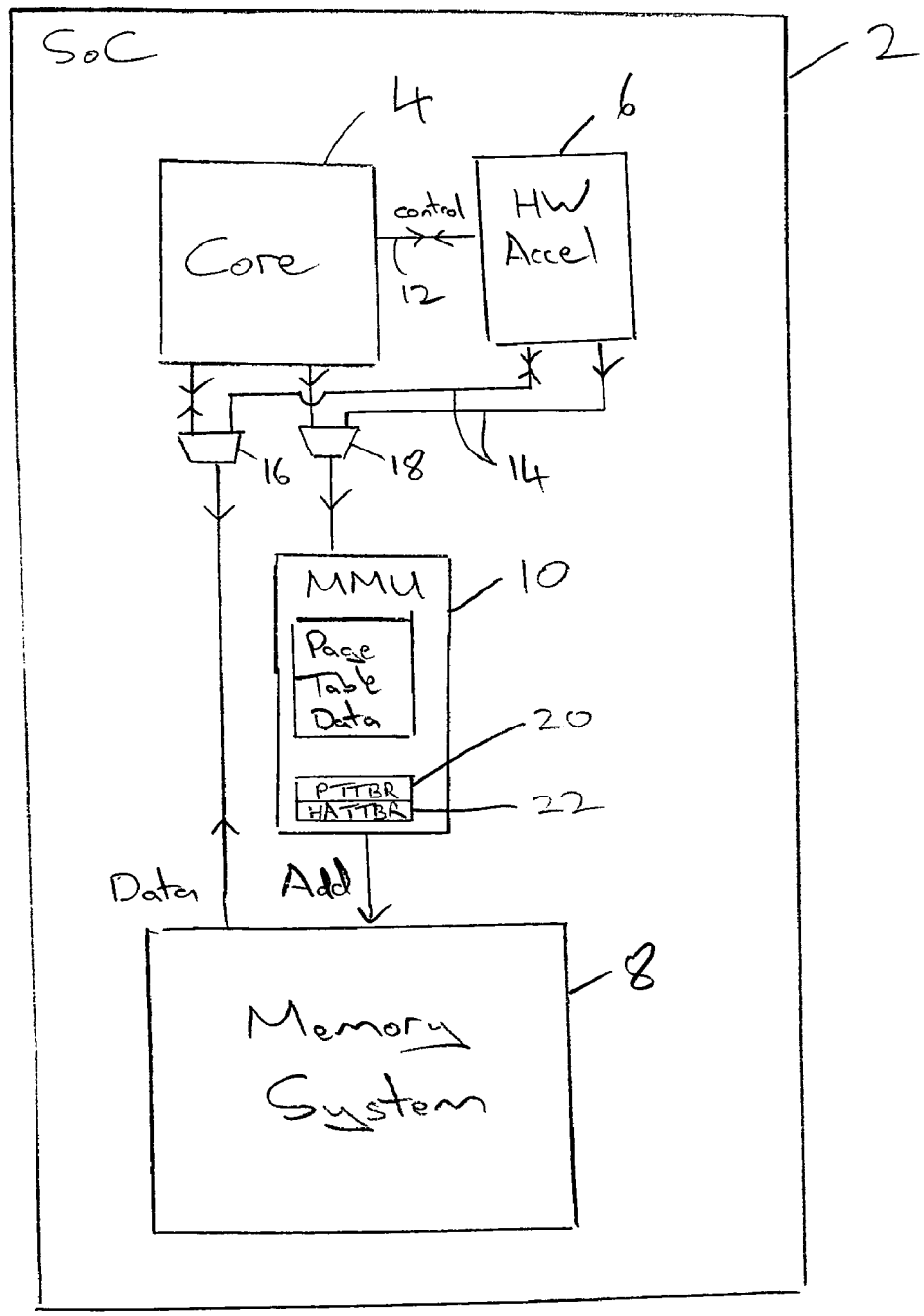
FIG. 1 schematically illustrates a first example embodiment of an integrated circuit including a general purpose processor and a hardware accelerator.

FIG. 1 illustrates an integrated circuit 2, such as a system-on-chip integrated circuit. This integrated circuit 2 includes a general purpose processor 4 which operates under program instruction control to perform data processing operations. A hardware accelerator 6 is coupled to the processor 4 and performs data processing operations upon data values accessed in a memory system 8. A shared memory management unit 10 serves to perform memory management operations upon memory accesses to the memory system 8 by both the processor 4 and the hardware accelerator 6. The memory system 8 can take a wide variety of different forms, including a hierarchical memory system comprising one or more levels of cache memory and a main memory as well as memory systems including tightly coupled memories and access to off-chip memory/storage. Embodiments are also possible having more than one hardware accelerator 6 and/or more than one general purpose processor 4.

The hardware accelerator 6 is provided with a first communication channel 12 using which it is able to transfer at least control signals between the processor 4 and the hardware accelerator 6. These control signals can include task request data from the processor specifying a processing task to be performed by the hardware accelerator. The task request data may be a task descriptor being a pointer to a structure in memory that may contain one or more of the items given below that can be passed by the control signals (pointer to input data structure, pointer to output data structure, pointer to temporary storage structures, . . . ). Other forms of signals which may be passed via this first communication channel 12 include one or more input data values to be used by the hardware accelerator 6, a pointer to one or more input data values to be used by the hardware accelerator 6, one or more output data values from the hardware accelerator 6 to be passed back to the processor 4, a pointer to one or more output data values from the hardware accelerator 6 to be passed back to the processor 4, a pointer to one or more data storage locations available for temporary value storage by the hardware accelerator 6 and status information (e.g. stopped or running) passed from the hardware accelerator 6 to the processor 4.

Also illustrated in FIG. 1 is a second communication channel 14 provided between the hardware accelerator 6 and the memory system 8. This second communication channel permits data access operations required by the hardware accelerator 6 to be issued to the memory system 8 without requiring a load/store instruction in the program flow of the processor 4. The second communication channel 14 is shown as tapping into the normal path between the core 4 and the memory system 8 at multiplexers 16, 18. These multiplexers 16, 18 are switched to provide access via this second communication channel 14 to the memory system 8 when the memory system 8 is not being accessed by the processor 4. Alternatively, the priority could be inverted such that the hardware accelerator 6 has priority over the processor 4 in accessing the memory system 8. Various other attribution schemes will be familiar to those in this technical field and could be used in this application.

As will be seen in FIG. 1, the shared memory management unit 10 is provided in the path between the memory system 8 and both the processor 4 and the hardware accelerator 6. The shared memory management unit 10 is responsive to page table data (which may be retrieved from the memory system 8) to perform memory management operations upon the data accesses being performed by both the processor 4 and the hardware accelerator 6. These memory management operations can include virtual-to-physical address translation, memory protection operations (such as the enforcement of privilege level access control) and generation of values for fault status/address registers upon occurrence of an exception. The page table data and the programming of the memory management unit 10 is normally performed under operating system control by the processor 4. The memory management unit 10 may also take the form of a memory protection unit storing a plurality of memory region descriptors giving memory attributes to be applied to said memory regions (possibly separately for the processor and the hardware accelerator).

The operating system will program the shared memory management unit 10 in accordance with a program context for a program thread being executed. This may be achieved by using a translation table base register which is programmed to point to a start address of page table data for a particular memory context to be used. In this example embodiment, the shared memory management unit 10 is provided with both a processor translation table base register 20 and a hardware accelerator translation table base register 22. When the hardware accelerator 6 is activated and a processing task is invoked thereupon, the current context indicated by the value stored within the processor translation table base register 20 is copied to the hardware accelerator translation table base register 22. This copying may be performed automatically by the hardware or may be performed by the operating system when starting a task on the hardware accelerator 6. This context for the hardware accelerator 6 can accordingly be maintained even if the processor 4 itself switches context before the hardware accelerator 6 has completed the task it was allocated. In alternative embodiments, the processor 4 and the hardware accelerator 6 may share a context and if the processor 4 switches context, then the task being performed upon the hardware accelerator 6 may be stopped (with saving of any temporary state within the hardware accelerator 6 if possible/desired to facilitate restarting). Such a stopped task may be restarted in its entirety or restarted from a point partway through its processing depending upon the nature of the task concerned and the abilities of the hardware accelerator 6.

For example, some hardware accelerators will not be designed to be restartable mid-way through their processing, but may be instructed to restart processing from the beginning.

It will be appreciated that the data processing system illustrated in FIG. 1 provides a relatively simple interface between the processor 4 and the hardware accelerator 6 via the first communication channel 12. This interface can be made insensitive to the micro-architecture of the processor 4 and accordingly permit the hardware accelerator 6 to be reused in combination with a variety of different processors 4 without significant change. The provision of the second communication channel 14 by which the hardware accelerator 6 can initiate its own data accesses to the memory system 8 relieves the processor 4 of this task thereby permitting the processor 4 to perform other operations rather than dedicating some of its resource to feeding the hardware accelerator 6 with input data and retrieving output data from the hardware accelerator 6. The shared memory management unit 10 permits the hardware accelerator 6 to benefit from the memory management operations provided for the processor 4 reusing the same hardware and potentially reusing much of the control of that shared memory management unit 10 which is performed by the operating system. In embodiments in which the hardware accelerator 6 shares its context with the processor 4 and is not permitted to have a separate context, then the operating system controlling the memory management unit 10 may in some embodiments not carry any responsibility for managing a context of the hardware accelerator 6 or managing its memory operations in a separate way to those of the processor 4.

In order to support fault status/address registers for multiple threads of execution of potentially the same process (e.g. a processor thread and a hardware accelerator thread), it is often appropriate to provide at least to fault status/address registers (2*FSR; 2*FAR) in the translation/protection mechanisms in order to deal with multiple exceptions generated at the same time. The FSR and FAR for the hardware accelerator 6 may be provided in the memory system 8, as core registers with the processor 4 or as register with the hardware accelerator 6 (or hardware accelerator cluster). An alternative less complex scheme may record fewer details concerning exceptions, e.g. a simple status bit could be provided to simply indicate that an error was encountered.

Figure 2:
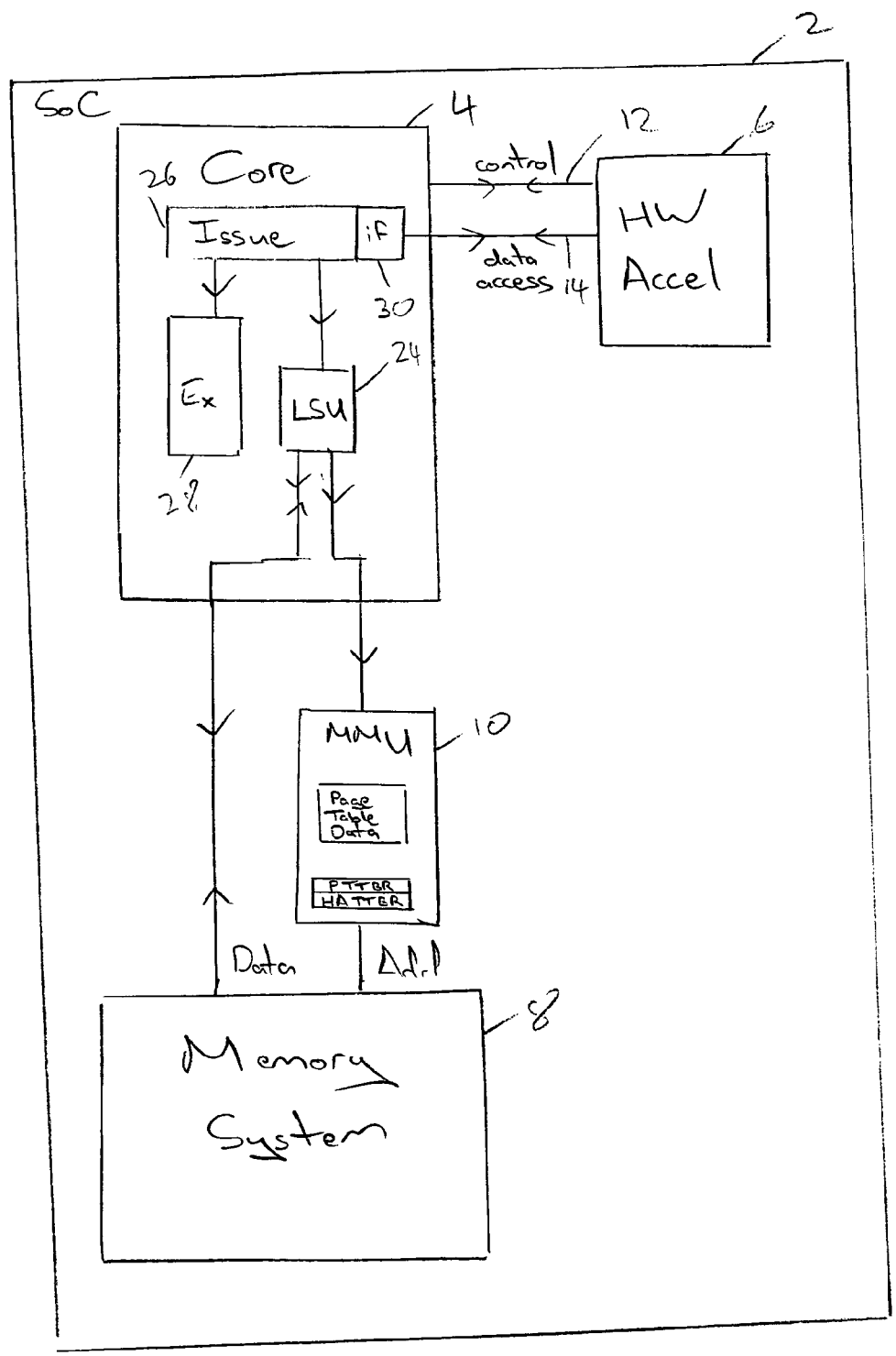
FIG. 2 schematically illustrates a second example embodiment of an integrated circuit including a general purpose processor and a hardware accelerator.

FIG. 2 illustrates a second example embodiment. In this example embodiment the second communication channel 14 is modified to reuse a load-store unit 24 provided within the processor 4. The processor 4 includes a processing pipeline including an issue stage 26, the load-store unit 24 and at least one execution unit 28. It will be appreciated in this technical field that the processing pipeline of the processor 4 will typically contain many additional stages and elements, such as a prefetch unit and a writeback stage, but these may be conventional and are not illustrated in FIG. 2 for the sake of clarity.

The load-store unit 24 provided within the processor 4 is responsive to program instructions executed by the processor 4 to perform data access operations upon the memory system 8 on behalf of the processor 4. In this example embodiment, the second communication channel 14 from the hardware accelerator 6 connects to an interface 30 within the issue stage 26 of the processor 4. This interface 30 (which includes an arbitration unit using a scheme such as if access to the memory system 8 is not needed by processor 4 on this cycle, then permit access to the memory system 8 for this cycle by the hardware accelerator 6) permits signals specifying data access operations required by the hardware accelerator 6 to be communicated to the issue stage 16 (i.e. injected into the pipeline) and when an unused issue slot for the load-store unit 24 becomes available then these data access operations required by the hardware accelerator can be issued into that slot to the load-store unit 24. If the data access is a read, then when the data is returned it is directed to the hardware accelerator 6 via the second communication channel 14 as the load-store unit 24 tracks whether the data access was performed on behalf of the processor 4 or the hardware accelerator 6. The load-store unit 24 directs its data accesses via the shared memory management unit 10 for data accesses originating from both the processor 4 and the hardware accelerator 6. Thus the same memory management operations can be performed for both of these sources of data accesses. The reuse of the load store unit 24 improves hardware efficiency and removes the need for the hardware accelerator 6 to include its own load-store unit 24. If a memory abort occurs then the appropriate abort status registers within one of the processor 4 and the hardware accelerator 6 will be set.

The data processing systems of FIGS. 1 and 2 both operate to perform data processing operations using the programmable general purpose processor 4 under control of program instructions executed by the processor 4. Data values to be processed by the processor 4 are stored within the memory system 8. The hardware accelerator 6 performs separate data processing operations upon data values accessed within the memory system 8. The shared memory management unit 10 performs memory management operations in respect of memory accesses for both the processor 4 and the hardware accelerator 6. The first communication channel 12 transfers at least control signals between the processor 4 and the hardware accelerator 6 via a relatively implementation-independent interface. The second communication channel 14 permits the hardware accelerator 6 to access data values within the memory system 8 without requiring a program instruction within the program flow of the processor 4, such as a load-store instruction.

Figure 3:
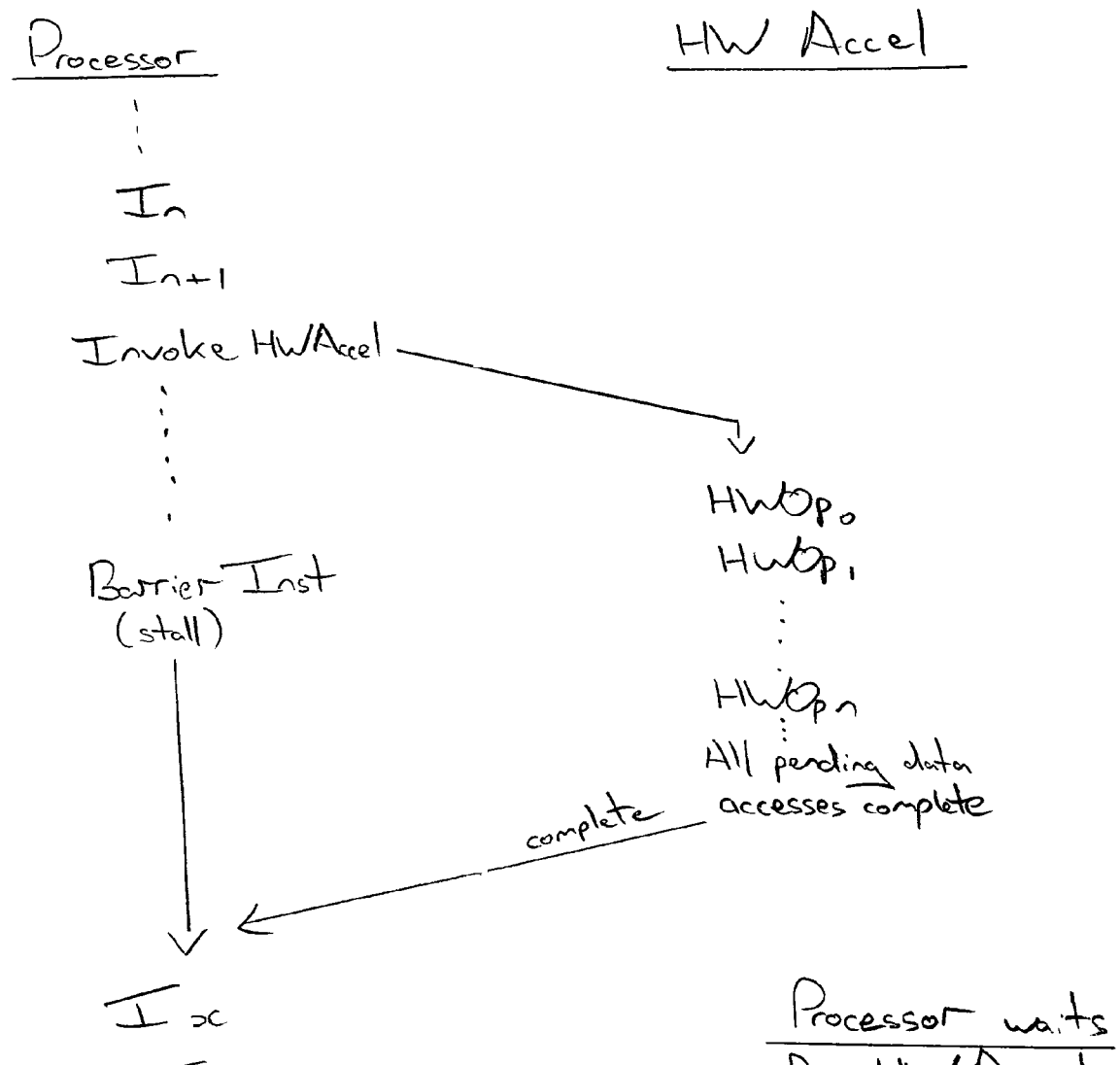
FIG. 3 is a diagram schematically illustrating processing flow when using a first type of barrier instruction.

FIG. 3 schematically illustrates the use of one type of barrier instruction executed by the processor 4. The processor 4 executes an instruction stream until an instruction is encountered which invokes a processing task to be performed by the hardware accelerator 6. At this time, processing operations are commenced by the hardware accelerator 6. The processing of program instructions by the processor 4 continues in parallel with the processing operations performed by the hardware accelerator 6. The processor 4 then executes a first type of barrier instruction. This first type of barrier instruction serves to stall the processing by the processor 4 until a complete signal is received from the hardware accelerator 6 indicating that the processing task which was invoked thereupon has completed. An example of the use of such a barrier instruction would be when the results being generated by the processing performed by the hardware accelerator 6 are required for program instructions to be executed by the processor 4 subsequent to the barrier instruction. In this way, synchronisation can be maintained between the processor 4 and the hardware accelerator 6.

Figure 4:
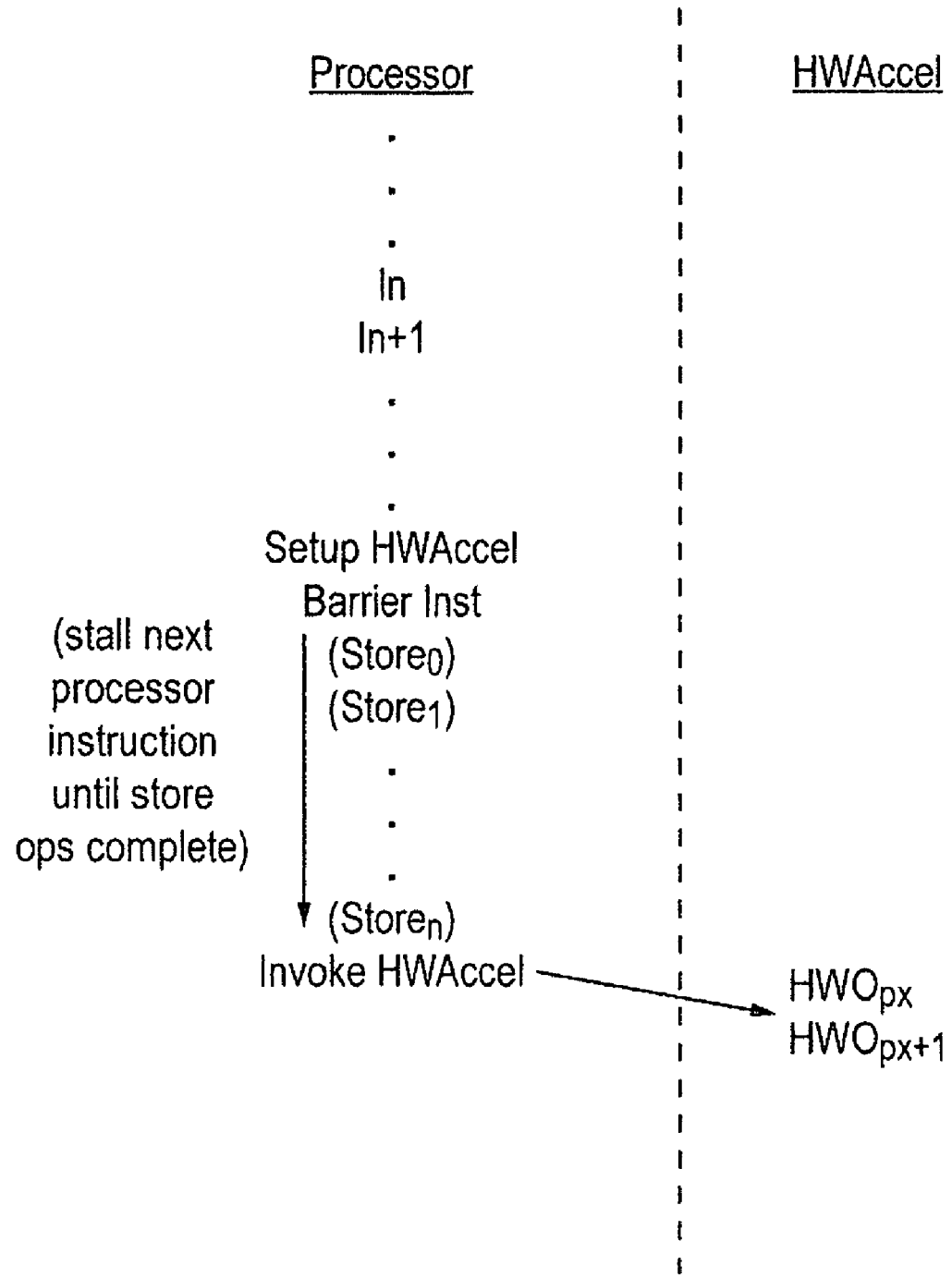
FIG. 4 is a diagram schematically illustrating processing flow when using a second type of barrier instruction.

FIG. 4 is a diagram illustrating program execution when using a second type of barrier instruction. The processor 4 executes some instructions required to set up the hardware accelerator 6. These instructions may be writing out data values to the memory system 8 which will then be read by the hardware accelerator 6. These data values to be written out the memory system 8 need to be in place in the memory system 8 (at least visible to the hardware accelerator 6) before the hardware accelerator 6 is permitted to commence execution. Accordingly, the processor 4 executes a second type of barrier instruction which serves to stall the processor 4 and prevent it executing further data processing operations until the storage operations initiated by the processor 4 have completed. The storage operations associated with both of these types of barrier instruction may be considered completed when they become visible to the relevant one of the processor 4 and the hardware accelerator 6 that did not initiate the storage operation.

The present invention and the above described techniques are related to three copending US patent applications with the same Assignee as the present application. These three copending applications are Controlling Cleaning of Data Values Within a Hardware Accelerator filed on 6 Dec. 2008 (Serial No. 12/000,005) Providing Secure Services to a Non-Secure Application filed on 2 Jan. 2008 (Ser. No. 12/003,857) and Protecting The Security Of Secure Data Sent From A Central Processor For Processing By A Further Processing Device filed on 2 Jan. 2008 (Ser. No. 12/003,858). The disclosure of these three copending applications is incorporated herein in its entirety by reference.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
 a programmable general purpose processor operating under program instruction control to perform data processing operations;
 a memory system coupled to said processor, said memory system operating to store data values to be processed by said processor;
 a hardware accelerator coupled to said processor and to said memory system and operating to perform data processing operations upon data values accessed in said memory system;
 a shared memory management unit coupled to said processor, said memory system and said hardware accelerator and operating to perform memory management operations in respect of memory accesses to said memory system by said processor and by said hardware accelerator;
 a first communication channel between said processor and said hardware accelerator for transferring at least control signals between said processor and said hardware accelerator; and
 a second communication channel coupling said hardware accelerator and said memory system for transferring data access operations between said hardware accelerator and said memory system, wherein said processor includes a load-store unit responsive to data access program instructions executed by said processor to perform data access operations upon said memory system for said processor and said second communication channel passes data access requests from said hardware accelerator to said load-store unit of said processor to perform data access operations upon said memory system for said hardware accelerator, wherein said processor includes a processing pipeline, said load-store unit being part of said processing pipeline, and said second communication channel injects data access requests from said hardware accelerator in to slots within said processing pipeline so as to use said load-store unit to perform data access operations upon said memory system for said hardware accelerator when said load-store unit not needed to perform data access operations upon said memory system for said processor.

2. The apparatus as claimed in claim 1, wherein an operating system program executed by said processor configures said shared memory management unit to provide memory management operations corresponding to a shared context that is shared by said processor and said hardware accelerator.

3. The apparatus as claimed in claim 1; wherein an operating system program executed by said processor configures said shared memory management unit to provide memory management operations corresponding to a processor context of said processor and a hardware accelerator context of said hardware accelerator, said processor context and said hardware accelerator context being separately provided.

4. The apparatus as claimed in claim 3, wherein said shared memory management unit is responsive to a processor translation table base register indicating a memory region storing page table data for said processor context and a hardware accelerator translation table base register indicating a memory region storing page table data for said hardware accelerator context.

5. The apparatus as claimed in claim 4, wherein a current value stored within said processor translation table base register is copied to said hardware accelerator translation table base register when a processing task is started upon said hardware accelerator.

6. The apparatus as claimed in claim 1, wherein said memory system comprises regions and said memory management unit is a memory protection unit storing a plurality of memory region descriptors giving memory attributes to be applied to said regions.

7. The apparatus as claimed in claim 6, wherein said memory region descriptors are separately provided for said processor and said hardware accelerator.

8. The apparatus as claimed in claim 1, wherein said first communication channel transfers one or more of:
   task request data from said processor specifying a processing task to be performed by said hardware accelerator;
   one or more input data values to said hardware accelerator;
   a pointer to one or more input data values to said hardware accelerator;
   one or more output data values from said hardware accelerator;
   a pointer to one or more output data values from said hardware accelerator; and
   a pointer to one or more data storage locations available for temporary value storage by said hardware accelerator.

9. The apparatus as claimed in claim 1, wherein said data access requests are injected into said processor under control of an arbitration unit.

10. The apparatus as claimed in claim 9, wherein said arbitration unit injects said data access requests if the load-store unit is not needed to perform data access operations upon said memory system for said processor.

11. The apparatus as claimed in claim 1, wherein processor is responsive to a barrier instruction executed by said processor to stall processing by said processor until said hardware accelerator generates a complete signal passed to said processor with said first communication channel indicating that said hardware accelerator has reached a given processing point.

12. The apparatus as claimed in claim 11, wherein said hardware accelerator delays generating said complete signal until any pending data accesses for said hardware accelerator have been issued to said memory system.

13. The apparatus as claimed in claim 1, wherein processor is responsive to a barrier instruction executed by said processor to stall processing by said processor until said processor has reached a given processing point.

14. The apparatus as claimed in claim 1, wherein said memory management operations comprise one or more of
   address translation operations;
   memory protection operations;
   storage of a value in a fault status register upon occurrence of an exception; and
   storage of a value in a fault address register upon occurrence of an exception.

15. Apparatus for processing data comprising:
   programmable general purpose processor means for performing data processing operations under program instruction control;
   memory system means, coupled to said processor means, for storing data values to be processed by said processor means;
   hardware accelerator means, coupled to said processor means and to said memory system means, for performing data processing operations upon data values accessed in said memory system means;
   shared memory management unit means, coupled to said processor means, said memory system means and said hardware accelerator means, for performing memory management operations in respect of memory accesses to said memory system means by said processor means and by said hardware accelerator means;
   first communication channel means, coupled between said processor means and said hardware accelerator means, for transferring at least control signals between said processor means and said hardware accelerator means; and
   second communication channel means, coupling said hardware accelerator means and said memory system means, for transferring data access operations between said hardware accelerator means and said memory system means, wherein said processor means includes a load-store unit responsive to data access program instructions executed by said processor means to perform data access operations upon said memory system means for said processor means and said second communication channel means passes data access requests from said hardware accelerator means to said load-store unit of said processor means to perform data access operations upon said memory system means for said hardware accelerator means, wherein said processor means includes a processing pipeline, said load-store unit being part of said processing pipeline, and said second communication channel means injects data access requests from said hardware accelerator means into slots within said processing pipeline so as to use said load-store unit to perform data access operations upon said memory system means for said hardware accelerator means when said load-store unit not needed to perform data access operations upon said memory system means for said processor means.

16. A method of processing data comprising:
   performing data processing operations with a programmable general purpose processor operating under program instruction control;
   storing data values to be processed by said processor within a memory system coupled to said processor;
   performing data processing operations upon data values accessed in said memory system using a hardware accelerator coupled to said processor and to said memory system;
   performing memory management operations in respect of memory accesses to said memory system by said processor and by said hardware accelerator using a shared memory management unit coupled to said processor, said memory system and said hardware accelerator;
   transferring at least control signals between said processor and said hardware accelerator via a first communication channel between said processor and said hardware accelerator; and
   transferring data access operations coupling said hardware accelerator and said memory system via a second communication channel between said hardware accelerator and said memory system, wherein said processor includes a load-store unit responsive to data access program instructions executed by said processor to perform data access operations upon said memory system for said processor and said second communication channel passes data access requests from said hardware accelerator to said load-store unit of said processor to perform data access operations upon said memory system for said hardware accelerator, wherein said processor includes a processing pipeline, said load-store unit being part of said processing pipeline, and said second communication channel injects data access requests from said hardware accelerator in to slots within said processing pipeline so as to use said load-store unit to perform data access operations upon said memory system for said hardware accelerator when said load-store unit not needed to perform data access operations upon said memory system for said processor.

17. The method as claimed in claim 16, wherein an operating system program executed by said processor configures said shared memory management unit to provide memory management operations corresponding to a shared context that is shared by said processor and said hardware accelerator.

18. The method as claimed in claim 16, wherein an operating system program executed by said processor configures said shared memory management unit to provide memory management operations corresponding to a processor context of said processor and a hardware accelerator context of said hardware accelerator, said processor context and said hardware accelerator context being separately provided.

19. The method as claimed in claim 18, wherein said shared memory management unit is responsive to a processor translation table base register indicating a memory region storing page table data for said processor context and a hardware accelerator translation table base register indicating a memory region storing page table data for said hardware accelerator context.

20. The method as claimed in claim 19, wherein a current value stored within said processor translation table base register is copied to said hardware accelerator translation table base register when a processing task is started upon said hardware accelerator.

21. The method as claimed in claim 16, wherein said memory system comprises regions and said memory management unit is a memory protection unit storing a plurality of memory region descriptors giving memory attributes to be applied to said regions.

22. The method as claimed in claim 21, wherein said memory region descriptors are separately provided for said processor and said hardware accelerator.

23. The method as claimed in claim 16, wherein said first communication channel transfers one or more of:
   task request data from said processor specifying a processing task to be performed by said hardware accelerator;
   one or more input data values to said hardware accelerator;
   a pointer to one or more input data values to said hardware accelerator;
   one or more output data values from said hardware accelerator;
   a pointer to one or more output data values from said hardware accelerator, and
   a pointer to one or more data storage locations available for temporary value storage by said hardware accelerator.

24. The method as claimed in claim 16, wherein said data access requests are injected into said processor under control of an arbitration unit.

25. The method as claimed in claim 24, wherein said arbitration unit injects said data access requests if the load-store unit is not needed to perform data access operations upon said memory system for said processor.

26. The method as claimed in claim 16, wherein processor is responsive to a barrier instruction executed by said processor to stall processing by said processor until said hardware accelerator generates a complete signal passed to said processor with said first communication channel indicating that said hardware accelerator has reached a given processing point.

27. The method as claimed in claim 26, wherein said hardware accelerator delays generating said complete signal until any pending data accesses for said hardware accelerator have been issued to said memory system.

28. The method as claimed in claim 16, wherein processor is responsive to a barrier instruction executed by said processor to stall processing by said processor until said processor has reached a given processing point.

29. The method as claimed in claim 16, wherein said memory management operations comprise one or more of:
   address translation operations;
   memory protection operations;
   storage of a value in a fault status register upon occurrence of an exception; and
   storage of a value in a fault address register upon occurrence of an exception.

* * * * *